US010698757B2

(12) United States Patent
Sasturkar et al.

(10) Patent No.: US 10,698,757 B2
(45) Date of Patent: Jun. 30, 2020

(54) TUNING CONTEXT-AWARE RULE ENGINE FOR ANOMALY DETECTION

(71) Applicant: Lightbend, Inc., San Francisco, CA (US)

(72) Inventors: Amit Sasturkar, San Jose, CA (US); Arun Kejariwal, Fremont, CA (US); Uday K. Chettiar, Mountain View, CA (US); Vishal Surana, Sunnyvale, CA (US); Omer Emre Velipasaoglu, San Francisco, CA (US); Dhruv Hemchand Jain, Santa Clara, CA (US); Mohamed A. Abdelhafez, Sunnyvale, CA (US)

(73) Assignee: Lightbend, Inc., San Francisco, CA (US)

( * ) Notice: Subject to any disclaimer, the term of this patent is extended or adjusted under 35 U.S.C. 154(b) by 0 days.

(21) Appl. No.: 16/276,431

(22) Filed: Feb. 14, 2019

(65) Prior Publication Data

US 2019/0250971 A1   Aug. 15, 2019

Related U.S. Application Data

(63) Continuation of application No. 15/289,112, filed on Oct. 7, 2016, now Pat. No. 10,228,996, and a (Continued)

(51) Int. Cl.
*G06F 11/00* (2006.01)
*G06F 11/07* (2006.01)
(Continued)

(52) U.S. Cl.
CPC .......... *G06F 11/079* (2013.01); *G06F 11/076* (2013.01); *G06F 11/0709* (2013.01); *G06F 11/0751* (2013.01); *G06F 11/0781* (2013.01); *G06F 11/30* (2013.01); *G06F 11/3006* (2013.01); *G06F 11/327* (2013.01); *G06F 11/3409* (2013.01); *G06F 11/3452* (2013.01); *H04L 41/00* (2013.01); *H04L 41/0816* (2013.01); *H04L 43/024* (2013.01); (Continued)

(58) Field of Classification Search
CPC ............... G06F 11/079; G06F 11/0709; G06F 11/0751; G06F 11/076; G06F 11/0781; G06F 11/30; G06F 11/3006; G06F 11/327; G06F 11/3409; G06F 11/3452
See application file for complete search history.

(56) References Cited

U.S. PATENT DOCUMENTS 7,788,536 B1 * 8/2010 Qureshi ................ G06F 11/079
714/38.14

\* cited by examiner

*Primary Examiner* — Katherine Lin
(74) *Attorney, Agent, or Firm* — Haynes Beffel & Wolfeld, LLP; Paul A. Durdik

(57) ABSTRACT

The technology disclosed relates to building ensemble analytic rules for reusable operators and tuning an operations monitoring system. In particular, it relates to analyzing a metric stream by applying an ensemble analytical rule. After analysis of the metric stream by applying the ensemble analytical rule, quantized results are fed back for expert analysis. Then, one or more type I or type II errors are identified in the quantized results, and one or more of the parameters of the operators are automatically adjusted to correct the identified errors. The metric stream is further analyzed by applying the ensemble analytical rule with the automatically adjusted parameters.

19 Claims, 14 Drawing Sheets

Related U.S. Application Data continuation of application No. 15/289,114, filed on Oct. 7, 2016, now Pat. No. 10,210,038.

(60) Provisional application No. 62/239,179, filed on Oct. 8, 2015.

(51) Int. Cl.
| | | |
|---|---|---|
| *G06F 11/30* | (2006.01) | |
| *H04L 12/24* | (2006.01) | |
| *H04L 12/26* | (2006.01) | |
| *G06F 11/34* | (2006.01) | |
| *G06F 11/32* | (2006.01) | |

(52) U.S. Cl.
CPC ...... *H04L 43/0852* (2013.01); *G06F 2201/81* (2013.01); *G06F 2201/875* (2013.01); *H04L 41/12* (2013.01); *H04L 41/5009* (2013.01); *H04L 43/08* (2013.01); *H04L 43/16* (2013.01)

TUNING CONTEXT-AWARE RULE ENGINE FOR ANOMALY DETECTION

CROSS-REFERENCE TO OTHER APPLICATIONS

This application is a continuation of U.S. patent application Ser. No. 15/289,114, entitled, "TUNING CONTEXT-AWARE RULE ENGINE FOR ANOMALY DETECTION," filed Oct. 7, 2016, which claims the benefit of U.S. provisional Patent Application 62/239,179, entitled, "CONTEXT-AWARE RULE ENGINE FOR ANOMALY DETECTION," filed on Oct. 8, 2015. The provisional and nonprovisional applications are hereby incorporated by reference for all purposes.

This application is a continuation of U.S. patent application Ser. No. 15/289,112, entitled, "CONTEXT-AWARE RULE ENGINE FOR ANOMALY DETECTION," filed Oct. 7, 2016, which claims the benefit of U.S. provisional Patent Application 62/239,179, entitled, "CONTEXT-AWARE RULE ENGINE FOR ANOMALY DETECTION," filed on Oct. 8, 2015. The provisional and nonprovisional applications are hereby incorporated by reference for all purposes.

U.S. Provisional Patent Application No. 62/239,224, entitled, "SYSTEMS AND METHODS OF CONSTRUCTING AND MONITORING A NETWORK TOPOLOGY," filed on Oct. 8, 2015. The provisional application is hereby incorporated by reference for all purposes.

U.S. Provisional Patent Application No. 62/107,340, entitled, "ANOMALY DETECTION USING CIRCUMSTANCE-SPECIFIC DETECTORS," filed on Jan. 23, 2015. The provisional application is hereby incorporated by reference for all purposes.

U.S. Provisional Patent Application No. 62/169,489, entitled, "HIERARCHICAL SERVICE ORIENTED APPLICATION TOPOLOGY GENERATION FOR A NETWORK," filed on Jun. 1, 2015. The provisional application is hereby incorporated by reference for all purposes.

U.S. Nonprovisional patent application Ser. No. 14/276,826, entitled, "ORGANIZING NETWORK PERFORMANCE METRICS INTO HISTORICAL ANOMALY DEPENDENCY DATA," filed on May 13, 2014. The nonprovisional application is hereby incorporated by reference for all purposes.

U.S. Nonprovisional patent application Ser. No. 14/276,846, entitled, "ORGANIZING NETWORK PERFORMANCE METRICS INTO HISTORICAL ANOMALY DEPENDENCY DATA," filed on May 13, 2014. The nonprovisional application is hereby incorporated by reference for all purposes.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Modern applications run on distributed computer systems over complex architectures where component and system statuses are monitored by collecting at regular intervals performance metrics such as CPU, memory, disk and network usage, and system service level agreements (SLAs). Further, the advent of cloud computing and online services has led to exponential growth in size and complexity of data centers. This has created unprecedented challenges for system management and monitoring. Given the scale and scope of such large data centers, network operators and monitoring tools are overwhelmed with monitoring and analyzing performance metrics across several thousand network layers and network elements. Currently, network operators and monitoring tools conduct much of the forensic examination when anomalous behaviors have already occurred by examining protocols or log files of past or recent running processes of the affected devices or applications.

It is therefore necessary to automate identification of system behavior changes that are reflected in the performance metrics of various network entities, so as to allow operators to take timely actions that maintain the service level agreements for the data centers. An opportunity arises to increase automation in network monitoring environments. Improved user experience and engagement and higher customer satisfaction and retention may result.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 3A is the input stream.

FIG. 3B shows one implementation of an output of a periodicity model with a wide aperture of 60 minutes.

FIG. 3C is a temporal aggregate with a narrow aperture of 5 minutes.

FIG. 3D illustrates one implementation of an output of a ratio operator.

FIG. 3E shows one implementation of an output of a multi-threshold operator.

DETAILED DESCRIPTION

Figure 1:
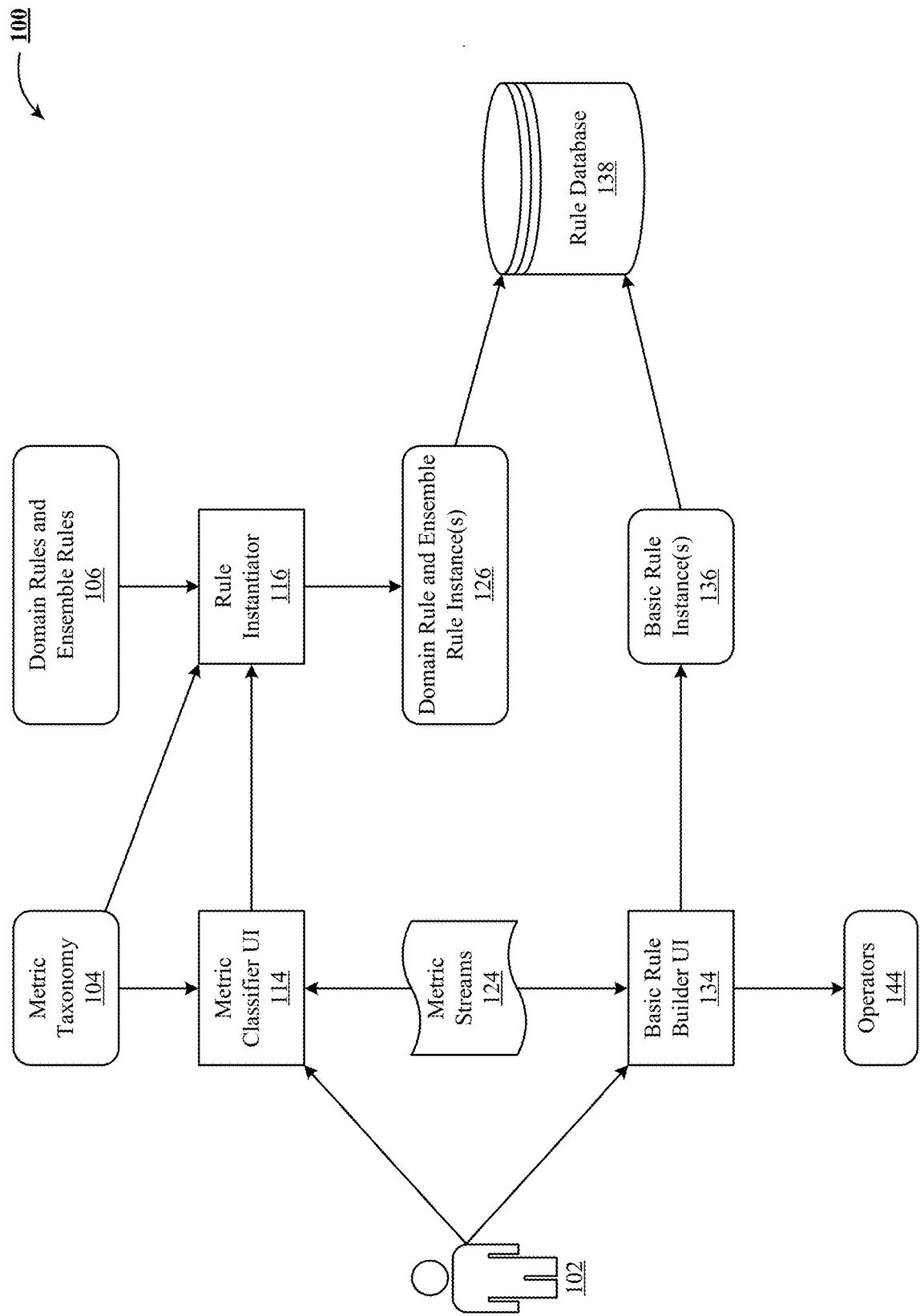
FIG. 1 depicts a rule design system that enables users to create anomaly detection rules for their system and service metrics in highly efficient and effective way.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

INTRODUCTION

Anomalies refer to any unexpected changes in a data stream. The technology disclosed can be applied to automatically identifying anomalies in data streams that exist in a variety of applications including, information technology (IT) systems, telecommunications systems, financial systems, security trading, banking, business intelligence, marketing, mining, energy, etc. One implementation of the technology disclosed relates to IT systems operations. IT operational data refers to any data that is produced by any human, system (hardware or software), machine, application, software, or component within an IT environment. Some examples of this operational data include metrics (server, network, database, services, hypervisor), alerts, logs, errors, software pushes, or application topology.

Unexpected changes in operational data i.e. anomalies are important for a number of reasons such as understanding the health of the system, alerting for system failures, or identifying the cause and symptoms for failures. One particular use of anomalies is to identify the most likely cause and symptom of system failures, and thereby enable faster resolution of these system failures. Any non-trivial system or data stream can have several anomalies in progress at any given time. Manually inspecting all anomalies to identify the actual cause of a failure can be a very time-consuming, cumbersome, and error prone process. Therefore, systems and methods that consistently and automatically identify anomalies for a wide variety of performance metrics can be very useful to network operators and end consumers.

As the scale and complexity of a network grows, the number of nodes, cores, processes, services, microservices and other network entities that require monitoring also increase. As a result, the task of identifying root causes of anomalies in the network and mitigating them becomes unmanageable. In addition, for today's Internet service, high availability, performance and reliability are necessary for delivering top notch user experience. To monitor such Internet services, it is not uncommon for today's Internet services to monitor millions of metrics. This, in part can be ascribed to the following:
 a. There are hundreds of micro-services in a typical Service Oriented Architecture (SOA).
 b. Each micro-service has multiple clusters. Each cluster in turn comprises of tens to hundreds of cores.
 c. On each core, hundreds to thousands of performance metrics, both system metrics and application metrics, are monitored.

Also, amongst other things, agile application development has fueled the growth of a number of performance metrics. Some examples of heterogeneous performance metrics include CPU usage, disk usage, network usage, system load, memory usage, and process fork rate metrics, disk writes, disk reads, inbound network traffic, outbound network traffic, disk data in, disk data out, CPU I/O wait time, CPU system time, CPU user time, CPU stolen time, one minute load average, file system utilization, memory bytes free, processor queue, context switches, total number of processes, number of idle processes and number of threads. In addition, organic growth of the user base has led to significant growth of the operational footprint. As a result, analysis of operational data via manual techniques and traditional dashboards is no longer feasible.

Furthermore, the heterogeneity of microservices and of the performance metrics makes it infeasible to use a single approach for anomaly detection. Moreover, the dynamic nature of machine data makes automatic operational analytics even more challenging.

The technology disclosed relates to context-aware anomaly detection. In particular, it relates to using deep domain knowledge about the semantics of the different performance metrics to develop global rules that detect anomalies across a plurality of performance metrics by analyzing the metric data across both temporal and spatial dimensions.

Examples of systems, apparatus, and methods according to the disclosed implementations are described in an information technology context. In other instances, the technology disclosed may be applied to fraud detection, telecommunications systems, financial systems, security trading, banking, business intelligence, marketing, mining, energy, etc. Other applications are possible, such that the following examples should not be taken as definitive or limiting either in scope, context or setting.

The technology disclosed relates to detecting anomalous behavior of network components in a complex network setting by using computer-implemented systems. The technology disclosed can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation.

Moreover, the technology disclosed can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

The technology disclosed can be implemented using different programming models like MapReduce™, bulk synchronous programming, MPI primitives, etc. or different stream management systems like Apache Storm™, Apache Spark™, Apace Kafka™, Truviso™, IBM Info-Sphere™, Borealis™ and Yahoo! S4™.

Rule Design System

FIG. 1 depicts a rule design system 100 that enables users to create anomaly detection rules for their system and service metrics in highly efficient and effective way. The inputs to the rule design system 100 are the metric streams 124, the metric taxonomy 104, domain rules and ensemble rules 106 and operators 144. The outputs are the basic rules instances 136 and domain rule and ensemble rule instances 126, which are stored in the rule database 138. The user 102 has access to at least two different user-interface (UI) modules, metric classifier UI 114 and basic rule builder UI 134. User 102 uses these modules to interact with the rule design system 100.

Operators and Rule Grammar

The technology disclosed includes a rule grammar based on flexible chaining of operators 144. The operators 144 serve as building blocks for statistical modeling, testing and decision making. Some examples of the operators include temporal and sequence aggregators with various statistical operators such as min, max, average, median, quantile, and others for smoothing and trend modeling, time-series seasonality model, as well as ratio and threshold operators. Each operator can take, as input, a metric stream or output stream of another operator. Some operators like ratio operator take two inputs, while other operators, like threshold operator, process a single input stream. Rule grammar allows organizing the operators 144 in a decision tree rooted by a single operator output. This decision tree is used for estimating severity of anomalous data points in the input streams.

Domain Rules

Domain rules incorporate specific and targeted expert domain knowledge optimized for a class of performance metrics. These rules are developed and entered into the rule design system 100 by operations experts using the rule grammar and operators 144, discussed supra.

One example of a domain rule is "seasonality corrected threshold", which is used to detect anomalies in performance metrics such as load balancer latency. This rule, expressed using the rule grammar and operators 144, is depicted below:

```
{
"id" : 2,
"description" : "Seasonality Corrected Threshold",
"streamVars" : ["stream1"],
"entryOperator" : "o1",
"operators" :
[
{
"name" :"o1",
"operator" : "RangeMap",
"params" : {"value_map" : [[2.0, "critical"], [1.5, "warning"], [0.2, "normal"], [0.0, "critical"]],
"default_value" : "normal"},
"operands" : {"left" : "o2"}
},
{
"name" :"o2",
"operator" : "Ratio",
"params" : {"valid_window" : 3600, "default_value" : 1.0},
"operands" : {"numerator" : "o3", "denominator" : "o4"}
},
{
"name" : "o3",
"operator" : "TemporalAggregator",
"params" : {"statistic" : "QUANTILE", "quantile" : 0.50, "window_size" : 300, "slide_by" : 30, "interpolate" : false},
"operands": {"operand" : "stream1"}
},
{ "
name" :"o4",
"operator" : "PeriodicityModel",
"params" : {"period_length" : 168, "num_periods" : 2, "statistic" : "MEAN", "interpolation" : 0,
"reference_time" : 1431302400, "time_resolution": 3600},
"operands" : {"operand" : "o5"}
},
```

-continued

```
{ "name" :"o5",
"operator" : "TemporalAggregator",
"params" : {"statistic" : "QUANTILE", "quantile" : 0.50, "window_size" : 3600, "slide_by" : 3600, "interpolate" : false},
"operands" : {"operand" : "stream1"}
}
]
}
```

In the decision tree shown above input is received by operators o5 and o3 and passed upwards to reach o1. Operator o5 is a temporal aggregator that calculates a median of the latency metric stream shown in FIG. 3A. This median is calculated over a window size of 3600 seconds, i.e., one day, and reported every 3600 seconds.

Figure 3A:
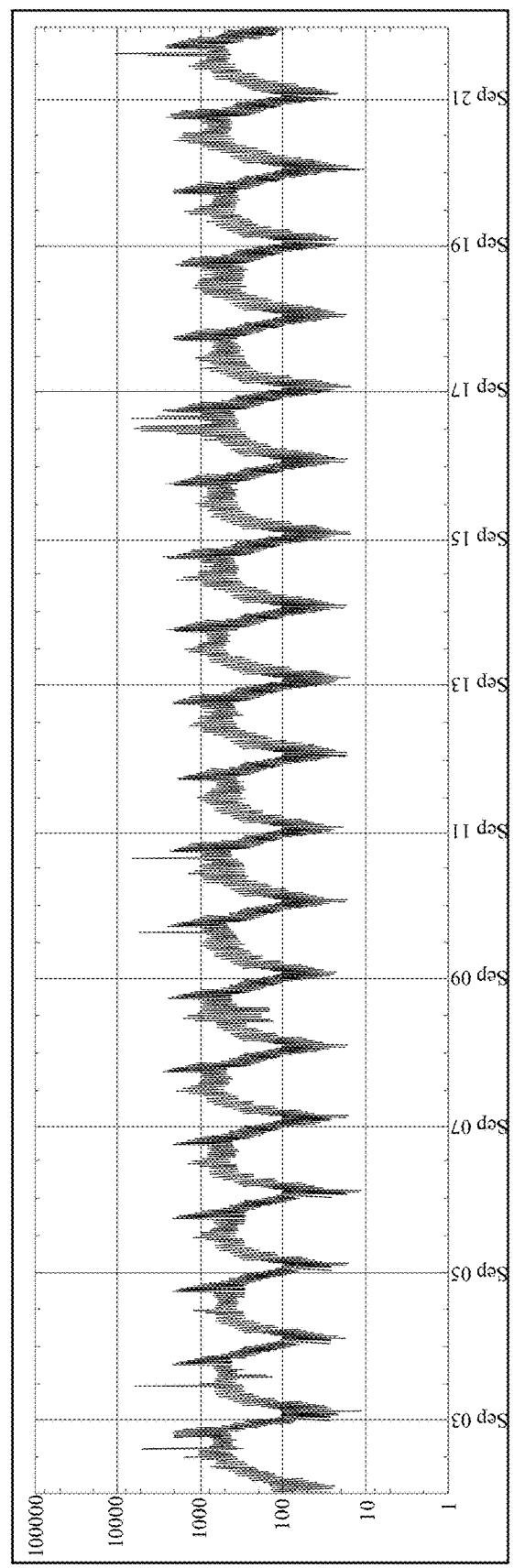
FIGS. 3A-3E track processing of a latency metric stream from input through temporal aggregation, ratioing and quantization.
Figure 3B:
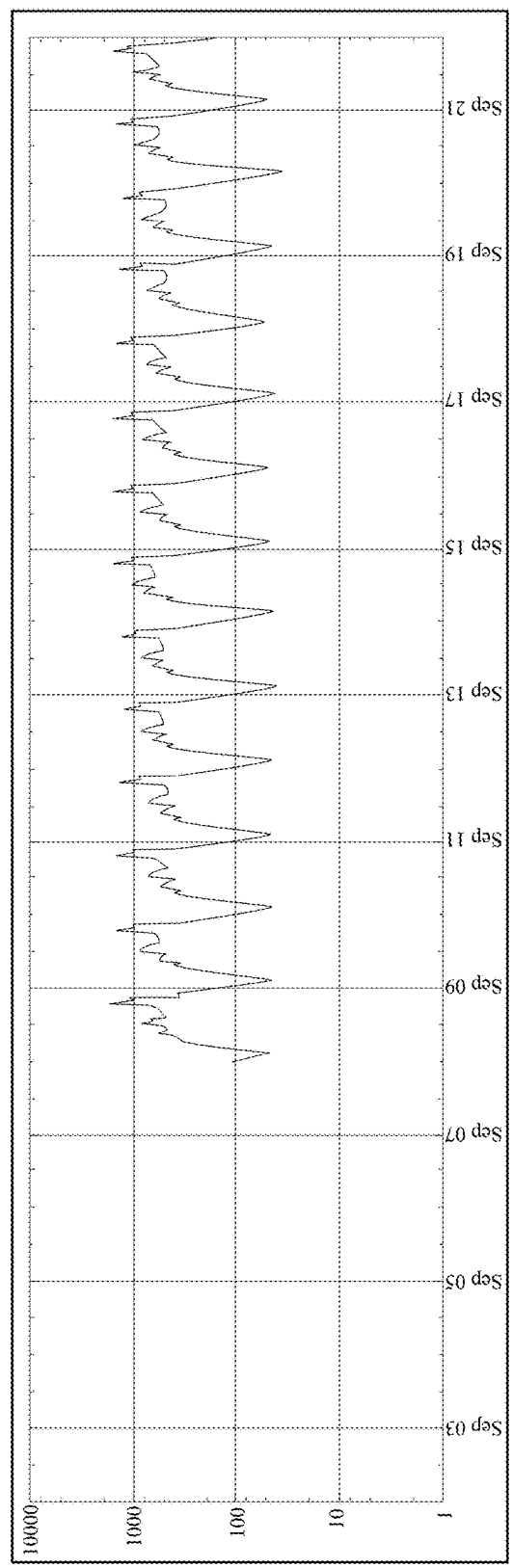

Operator o4 is a periodicity model, shown in FIG. 3B, which generates a mean of historical data for the latency metric of FIG. 3A from this week (identified by a period length of 168 hours) and next week (identified by 2 periods). FIG. 3A is one implementation of a latency metric stream 300A.

Operator o3 generates a median of the current metric data values for the last 300 seconds, i.e. five minutes, and reports the metric every 30 seconds, i.e. half minute. FIG. 3B shows one implementation of an output 300B of a periodicity model.

Figure 3C:
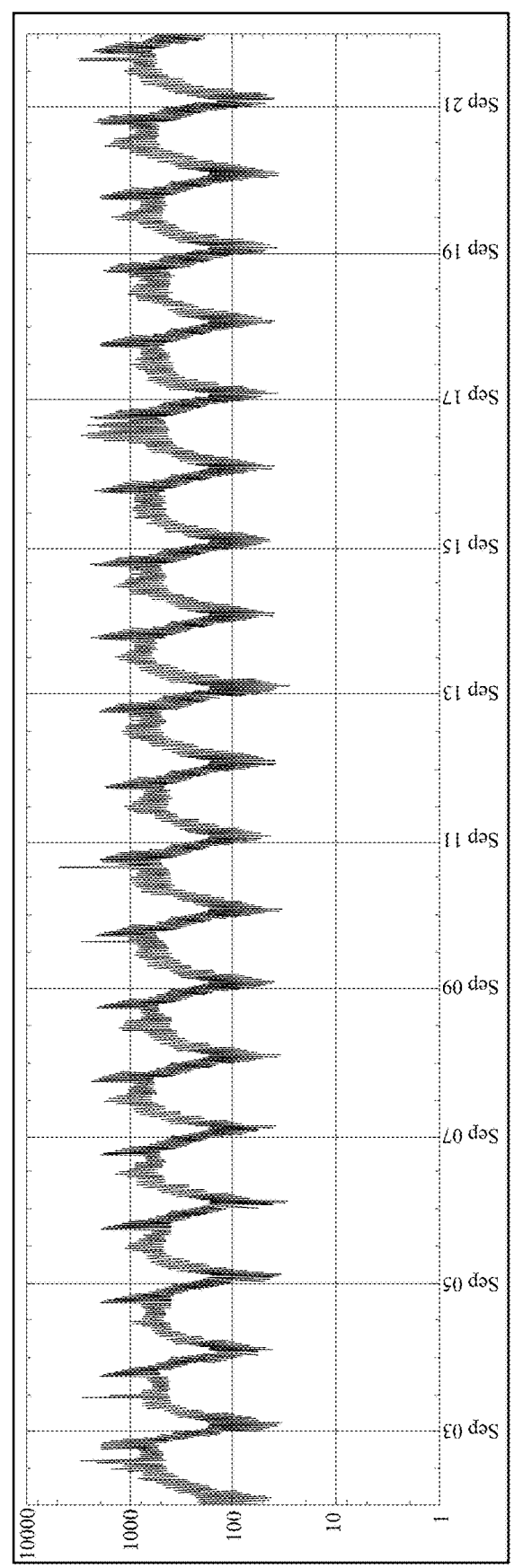

Operator o2 takes operator o3 as the numerator and operator o4 as the denominator and determines are ratio between them. FIG. 3C illustrates one implementation of an output 300C of the ratio operator.

Figure 3D:
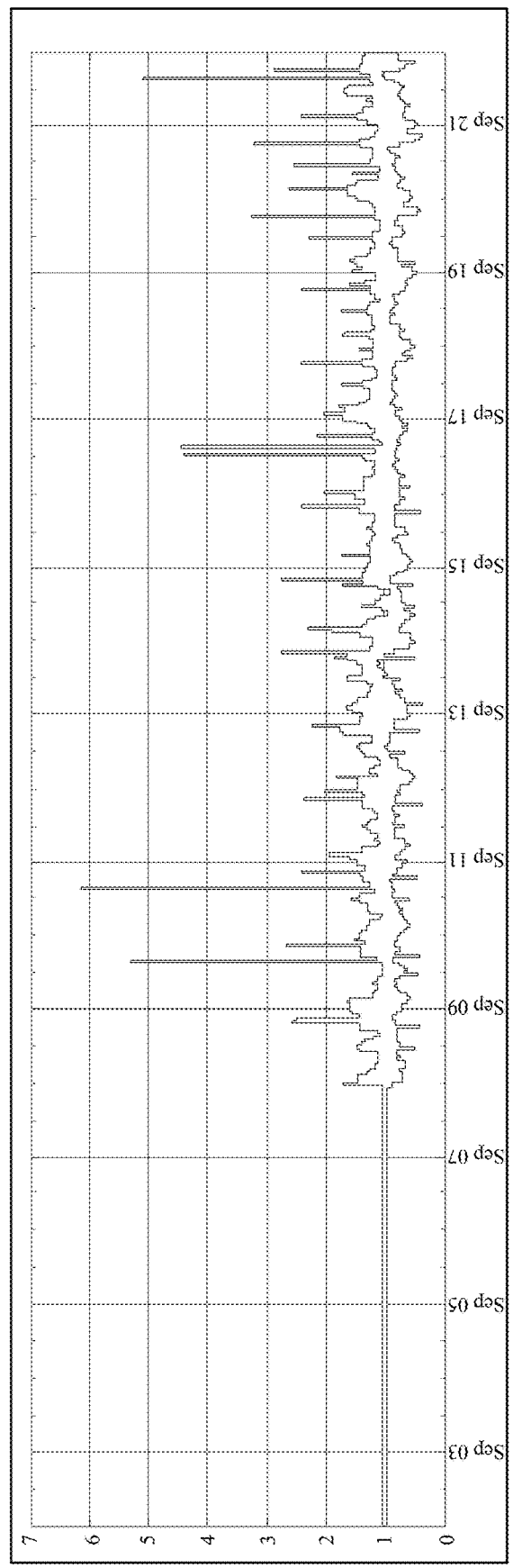
Figure 3E:
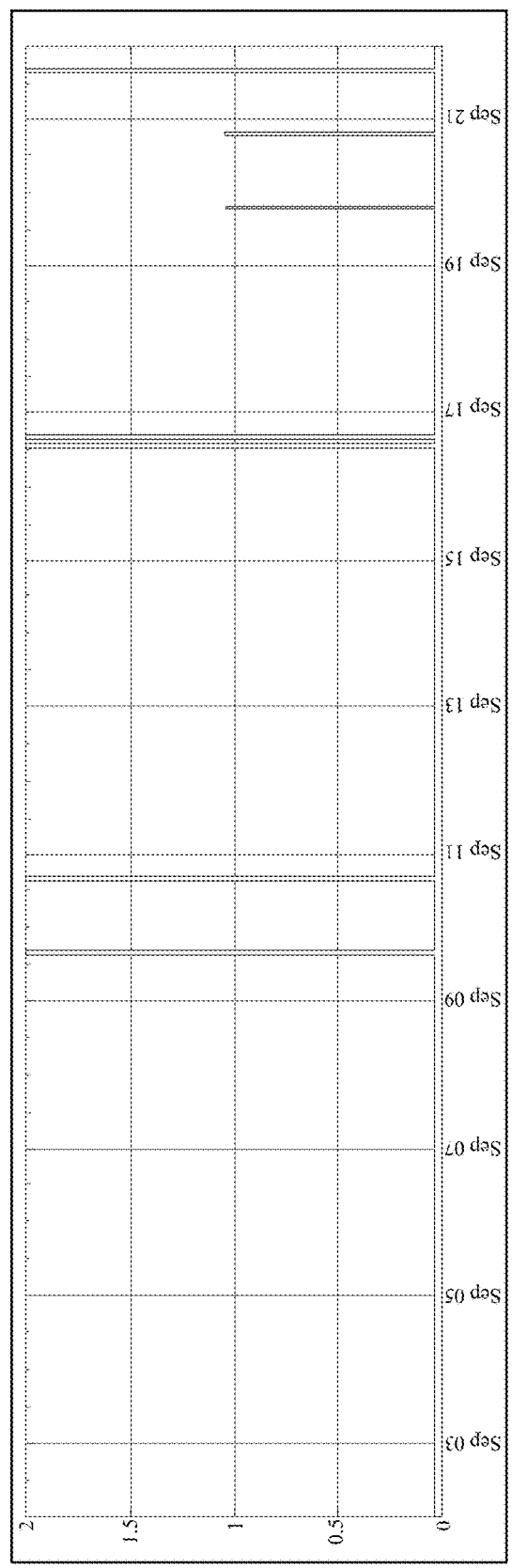

Operator o1 is a range map that generates various degrees of alerts depending on the value of the ratio. If the value of the ratio is between 0.0 and 0.2, then a critical alert is generated, in one implementation. If the value of the ratio is between 0.2 and 1.5, then a normal alert is generated, in one implementation. If the value of the ratio is between 1.5 and 2.0, then a warning alert is generated, in one implementation. If the value of the ratio is 2.0 and above, then also a critical alert is generated, in one implementation. In other implementations, different parametric values can be used. Operating on the data 300D in FIG. 3D, a multi-threshold operator produces output 300E in FIG. 3E.

A seasonality corrected threshold as illustrated by FIG. 3A-3E can be applied to a plurality of latency metrics, including awselb.Latency.value (AWS ELB Latency), awselb.RequestCount.value, awssqs.NumberOfMessagesReceived.value, memcached.memcached_connections.current.value (memcached metrics), redis.redis_commands_processed, redis.redis_connections.clients (ReDis metrics), zookeeper.gauge.latencyavg.value, nginx.nginx_requests.value, tail.response_time.nginx.requests.latency.value, tail.counter.tomcat.requests.value, tail.response_time.tomcat.requests.latency.value, tail.counter.apache.requests.value, tail.response_time.apache.requests.latency.value, GenericJMX.gauge.kafka_BrokerTopicMetricsAllTopicsMessagesInPerSec.Count.value, haproxy.req_rate.

Another example of a domain rule is "dynamic threshold based on recent data", which is used to detect anomalies in performance metrics such as cache miss ratio. This rule, expressed using the rule grammar and operators 144, is depicted below:

```
{
"id" : 6,
"description" : "Dynamic threshold based on recent data",
"streamVars" : ["stream1"],
"entryOperator" : "o1",
"operators" :
[
{
"name" : "o1",
"operator" : "RangeMap",
"params" : {"value_map" : [[10, "critical"], [5, "warning"]],
"default_value" : "normal"},
"operands": {"left" : "o2"}
},
{
"name" : "o2",
"operator" : "SequenceAggregator",
"params" : {"statistic" : "COUNT", "window_size" : 10, "slide_by" : 1},
"operands": {"operand" : "o3"}
},
{
"name" : "o3",
"operator" : "Threshold",
"params" : {"comparator" : ">", "value" : 5},
"operands" : {"left" : "o4"}
},
{
"name" : "o4",
"operator" : "Ratio",
"params" : {"valid_window" : 60, "default_value" : 1.0},
"operands" : {"numerator" : "stream1", "denominator" : "o5"}
},
{
"name" : "o5",
"operator" : "TemporalAggregator",
"params" : {"statistic" : "MEAN", "window_size" : 86400, "slide_by" : 60, "interpolate" : false},
"operands" : {"operand" : "stream1"}
}
]
}
```

In the decision tree shown above input is received by operators o5 and o3 and passed upwards to reach o1. Operator o5 is a temporal aggregator that calculates a mean of a metric stream for the last 86400 seconds, i.e., one day. This median is reported every 60 minutes, i.e., one hour.

Operator o4 takes the current metric stream as the numerator and operator o5 as the denominator and determines are ratio between them.

Operator o3 detects whether the value of the ratio determined by operator o4 is above a threshold. In the example used in the decision tree, if the ratio is more than five, then the metric stream is sent to operator o2 for an error count.

Operator o2 determines an error count in the metric stream for the last ten minutes using a sequence aggregator operator.

Operator o1 is a range map that generates various degrees of alerts depending on the value of the error count. If the value of the error count is between 5 and 10, then a warning alert is generated, in one implementation. If the value of the error count is 5 and above, then also a critical alert is generated, in one implementation. In other implementations, different parametric values can be used.

Dynamic threshold based on recent data can be applied to a plurality of recovery metrics, including memcached.percent.missratio.value and redis.redis_keyspace_misses.ratio.

Ensemble Rules

Ensemble rules are more generalized variants of the domain rules based on different time series and stream processing models. These rules apply to those performance metrics for which domain rules are not available. Ensemble rules are also designed using the rule grammar and operators 144 by the operations experts. Some examples of ensemble rules include a trend model and change detector rule, periodicity model and change detector rule, residual model and change detector rule, mean change detector rule, variance change detector rule and non-parametric distribution change detector rule.

Metric Taxonomy

Implementations of the technology disclosed include a taxonomy 104 of operational metric types that are encountered in popular services such as load balancers, web servers and key-value stores. Some examples of the metrics type include time taken to do work (e.g. latency) and work creation rate (e.g. request count). The operations experts further map the domain rules and ensemble rules 106 designed above to the metric taxonomy 104.

Metric Classifier UI

The rule design system 100 includes a metric classifier UI 114 that provides a list of metric streams 124 from a user's application along with the metric taxonomy 104 for the user to select metric types to apply to the metric stream from the application. In other implementations, metric classifier UI 114 includes a metric classifier that uses the metric data along with metric metadata such as the name of the metric, the host and the service to which the metric belongs to, and automatically classifies the metric to the metric taxonomy 104. Metrics that are not automatically classified can be preserved to the user for manual classification.

In some implementations, metric classifier UI 114, in conjunction with automatic topology discovery described in U.S. Provisional Patent Application No. 62/169,489, entitled, "HIERARCHICAL SERVICE ORIENTED APPLICATION TOPOLOGY GENERATION FOR A NETWORK," supra, and incorporate herein can allow a user to quickly specify the most appropriate domain rules and ensemble rules for large groups of services, hosts and metrics. Consequently, this significantly reduces the amount of time required to set up an anomaly detection system.

Rule Instantiator

Rule instantiator 116 selects the most appropriate rule for a particular performance metric by using the metric class selected in the metric classifier UI 114 and the domain rules and ensemble rules 106 mapped to the metric taxonomy class 104 by the operations experts. Once the most appropriate rule is matched with a particular performance metric, the result is a domain or ensemble rule instance 126.

Basic Rules

Rule design system 100 includes a basic rule builder UI 134 that provides a list of operators 144 and metric streams 124 for the user 102 to build basic rules using the rule grammar, discussed supra. In some implementations, the basic rules take the form of a temporal aggregation (moving window, isolated windows) coupled with an appropriate statistical operator (min, max, mean, average median, quantile, etc.). In one implementation, basic rules are used when metric taxonomy classes and domain rule and ensemble rule instances 126 do not match a particular performance metric or do not apply to a particular metric stream. In other cases, basic rules are used to quickly setup rule templates for any given performance metric by incorporating the expertise of the user 102 to complement the expertise of the operations experts. Basic rules can be used to create an anomaly training set, either directly or human curated.

Rule Database

Rule database 138 stores the basic rule instances 136 and the domain rule and ensemble rule instances 126 for each metric.

Rule Execution System

Figure 2:
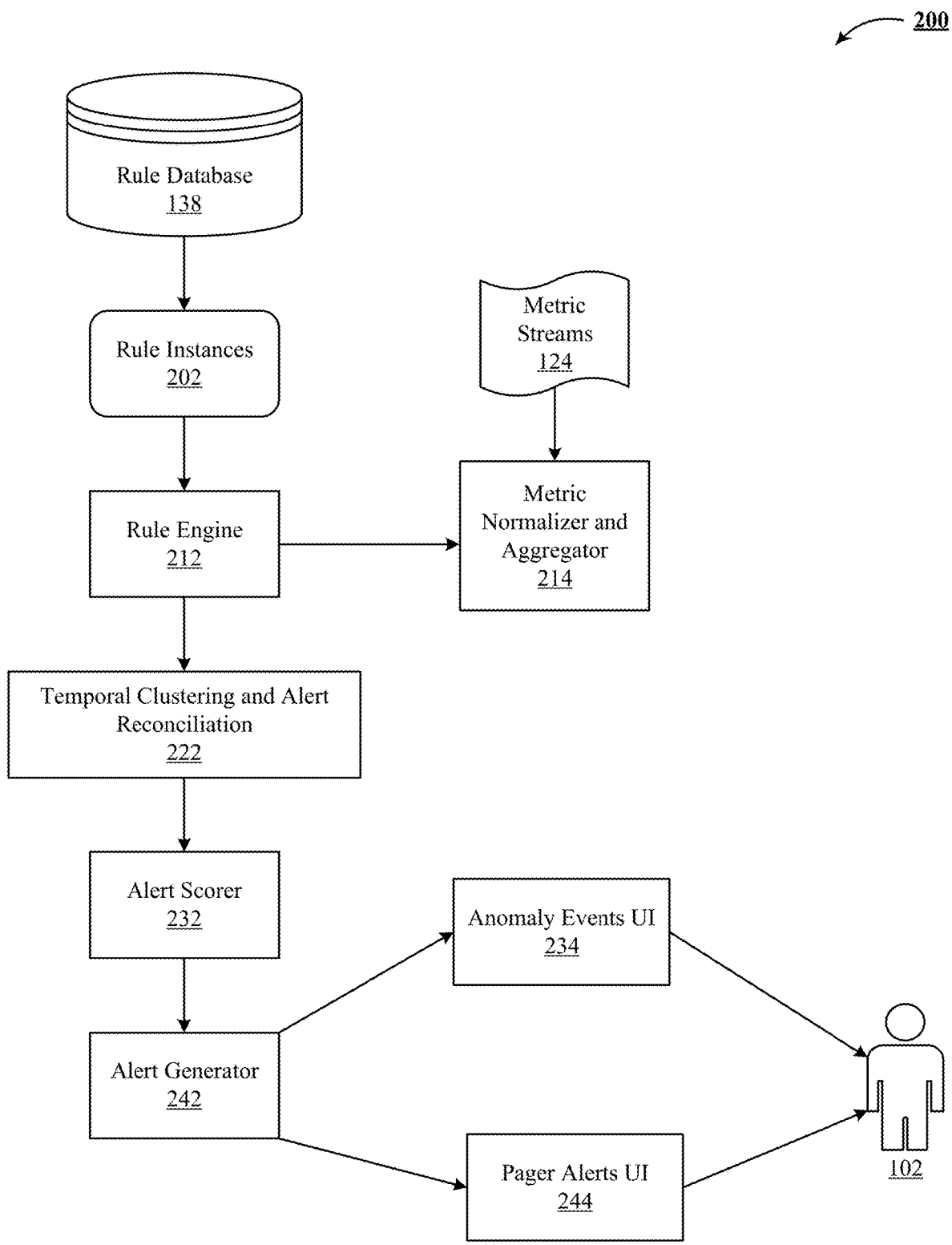
FIG. 2 illustrates one implementation of a rule execution system in a real-time operation mode.

FIG. 2 illustrates one implementation of a rule execution system 200 in a real-time operation mode. The inputs to the rule engine 212 are the metric streams 124 and the rule instances 202. The outputs consumed by the user 102 via anomaly events UI 234 and pager alerts UI 244 are anomaly events and pager alerts.

Metric Normalizer and Aggregator

Some metrics are better represented by the spatial aggregation of several constituent streams. An example is the CPU load on a cluster of four machines. In one implementation, each individual CPU metric stream is analyzed. In another implementation, anomaly detection is performed on the average of the four CPU metric streams. For such an implementation, a spatial aggregator is used as a pre-processor for the metric stream. The spatial aggregator allows various aggregation methods, including max, min, mean, median, and quantile.

For certain inherently spiky and noisy metric streams, a low pass filter such as a temporal aggregator is used to smoothen the spiky and noisy metric streams. The temporal aggregator allows various aggregation methods, including max, min, mean, median, and quantile.

Spatial aggregator and temporal aggregator are collectively represented as metric normalizer and aggregator 214.

Metric Streams

In some implementations, metric streams 124 are collections of events that are registered as they are generated. In one implementation, events are delivered over HTTP to an input pipeline. In another implementation, events are transmitted via POST requests to a receiver operating on behalf of the input pipeline. In one implementation, metric streams 124 are streams of JSON objects including metadata about the metrics. These JSON objects are stored in a schema-less or NoSQL key-value data-store like Apache Cassandra™, Google's BigTable™, HBase™, Voldemort™, CouchDB™, MongoDB™ Redis™, Riak™, Neo4J™, etc., which stores the parsed JSON objects using key spaces that are equivalent to a database in SQL. Each key space is divided into column families that are similar to tables and comprise of rows and sets of columns.

In some implementations, a batch processing framework operating on the metric streams 124 detects anomalies using OnLine Analytical Processing (OLAP) queries, which are stored in a batch store. In one implementation, anomalous events are stored in the batch store to act as a backup for raw events on which batch processing jobs can run at any given time. The batch store, in some implementations, provides raw counts as well as descriptive statistics such as mean, median and percentile breakdowns. In one implementation, analytics tool like Scalding™ and Pig™ operate on the batch store to provide retrospective analysis, machine learning modeling, and other batch analytics. In yet other implementations, the batch store is used to correct errors made by real-time stream processing or to handle upgraded capabilities by running analytics on historical data and recompute results.

Rule Engine

Rule engine 212 loads the rule instances 202 from the rule database 138 and applies them to the appropriate metric streams 124. In one implementation, rule engine 212 is highly scalable real-time stream processing engine using a combination of stream processing frameworks and batch processing frameworks. A stream processing framework provides real-time processing of sequences of unbounded events from metric streams 124 for delivery of immediate analytics and insights based on the events as they are occurring. In one implementation, such as stream processing framework processes a million events per second per node. This stream processing framework can be implemented using one or more stream processors like Apache Storm™ and Apache Samza™ or a batch-stream processor such as Apache Spark™. In one implementation, such as stream processing framework includes an API to write jobs that run over a sequence of event-tuples and perform operations over those event-tuples.

An example of a batch processing framework implementing a MapReduce programming model over a Hadoop distributed file system (HDFS).

Temporal Clustering and Alert Reconciliation

Temporal clustering and alert reconciliation 222 determines the alert policy, according to one implementation of the technology disclosed. This includes time clustering that involves setting a maximum number of alerts that a user can see in a given time window, thereby combining the alerts into a single alert if they occur in a quick succession. Temporal clustering and alert reconciliation 222 also generates an alert if the data is missing for a preset interval. Temporal clustering and alert reconciliation 222 determines also generates an alert if the rule fires at least n times in the past m minutes. This ensures that rule flapping, i.e. rapid firing of the rule when the metric value is very close to the threshold, does not result in an excessive number of alerts. Temporal clustering and alert reconciliation 222 also detects asymmetric state changes. For example, when a system switches back to a normal state from a critical state, this transition is detected by temporal clustering and alert reconciliation 222 and identified as non-normal.

Alert Scoring

Alert scorer 232 collects the grouped alerts generated by temporal clustering and alert reconciliation 222 and calculates an alert score for the combined events. In addition, alerts generated by the rule engine 212 include a severity value. This value is combined with another metric importance parameter to generate the alert score. In one implementation of the technology disclosed, metric importance comes from a ranked list of critical metrics for each service. This list is generated by the operations experts based on their domain knowledge. In another implementation of the technology disclosed, the metric importance is automatically calculated based on the features of the service and the host the metric comes from. For a metric that is not deemed as an important metric, the alert score is capped so that critical level events are not generated for that metric.

Alert Generation

Alert generator 242 generates and sends anomalous events to an anomaly events UI 234 as well as to a pager alerts UI 244 through which the user 102 consumes the results of the anomaly detection system disclosed herein.

Figure 4:
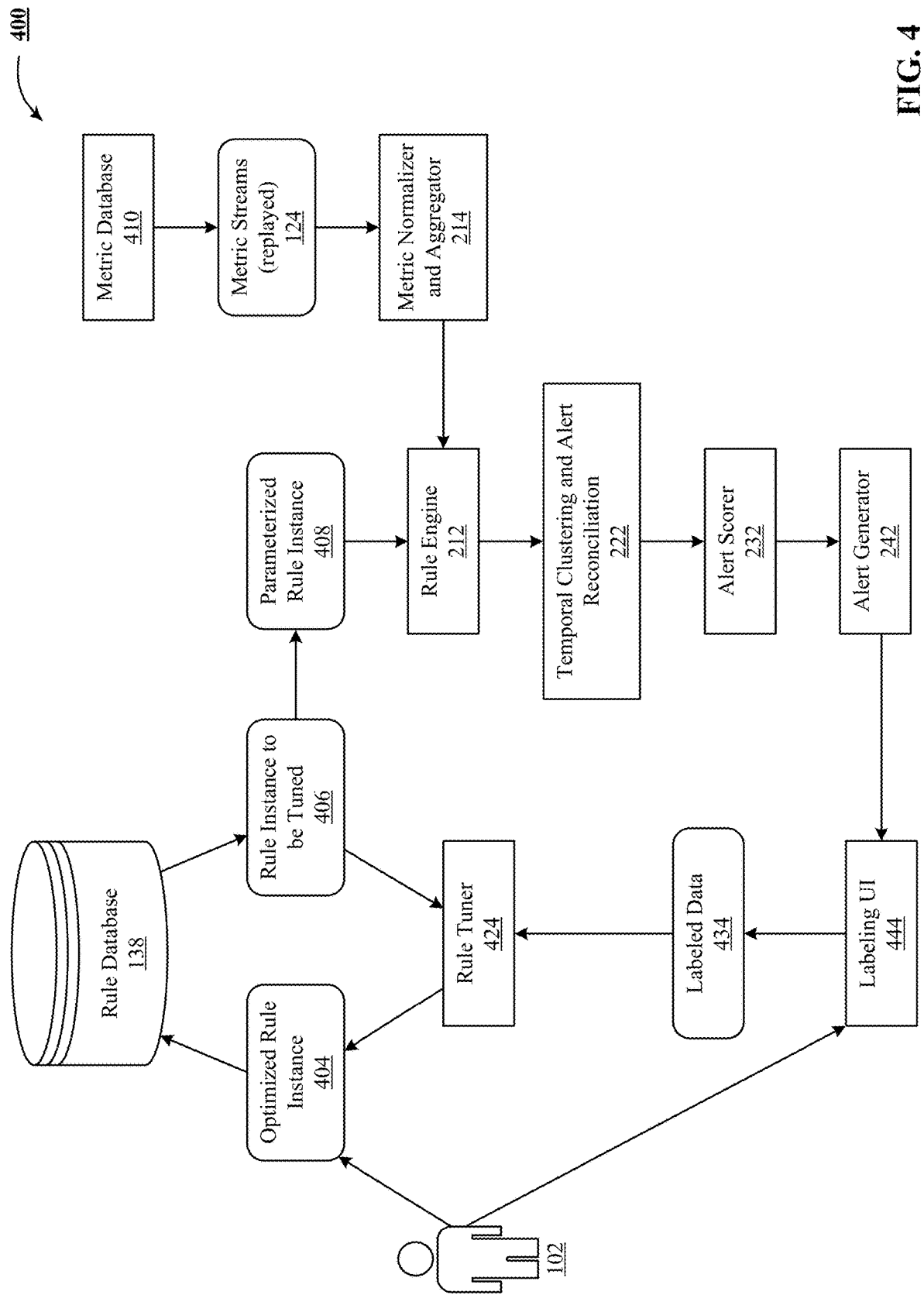
FIG. 4 depicts one implementation of a rule execution system in a tuning mode.

FIG. 4 depicts one implementation of the rule execution system 100 in a tuning mode 400.

Rule Tuner—Specification Mode

In one implementation, user 102 interacts with a rule tuner 424 to select a rule instance 406 to tune the parameters and generate a parameterized rule instance 408. In some implementations, user 102 specifies a time range for which captive data exists in a metric database 410 for which the rule needs tuning. The user 102 then triggers the rule engine 212 to load the replayed metric streams 124 as well as the rule instance with the specified parameters. The processing chain from the rule engine 212 to alert generator 242 that is used in the real-time operation mode is executed on the test data.

Labeling UI

User 102 visualizes the output of the alert generator 242 along with the underlying metric streams 124 using the labeling UI 444 (so-called "LabelMatic"). The user can then choose events or time ranges and label them with an alert severity value, according to one implementation of the technology disclosed.

Rule Tuner—Optimization Mode

Rule tuner 424 consumes the labeled data 434 from the labeling UI 444 and calculates the performance of the rule instance with the selected parameters on measures such a precision, recall and f-measure. In one implementation, the user 102 can then select a new parameter set and rerun the execute-label loop. In another implementation, rule tuner 424 uses search algorithms such as coordinate descent to automatically update parameters, rerun the rule engine 212 and recalculate the performance. This automatically optimizes the parameters of the selected rule instance. Finally, the optimized rule instance 404 is written back to the rule database 138.

Machine-Learned Anomaly Detection

Figure 5:
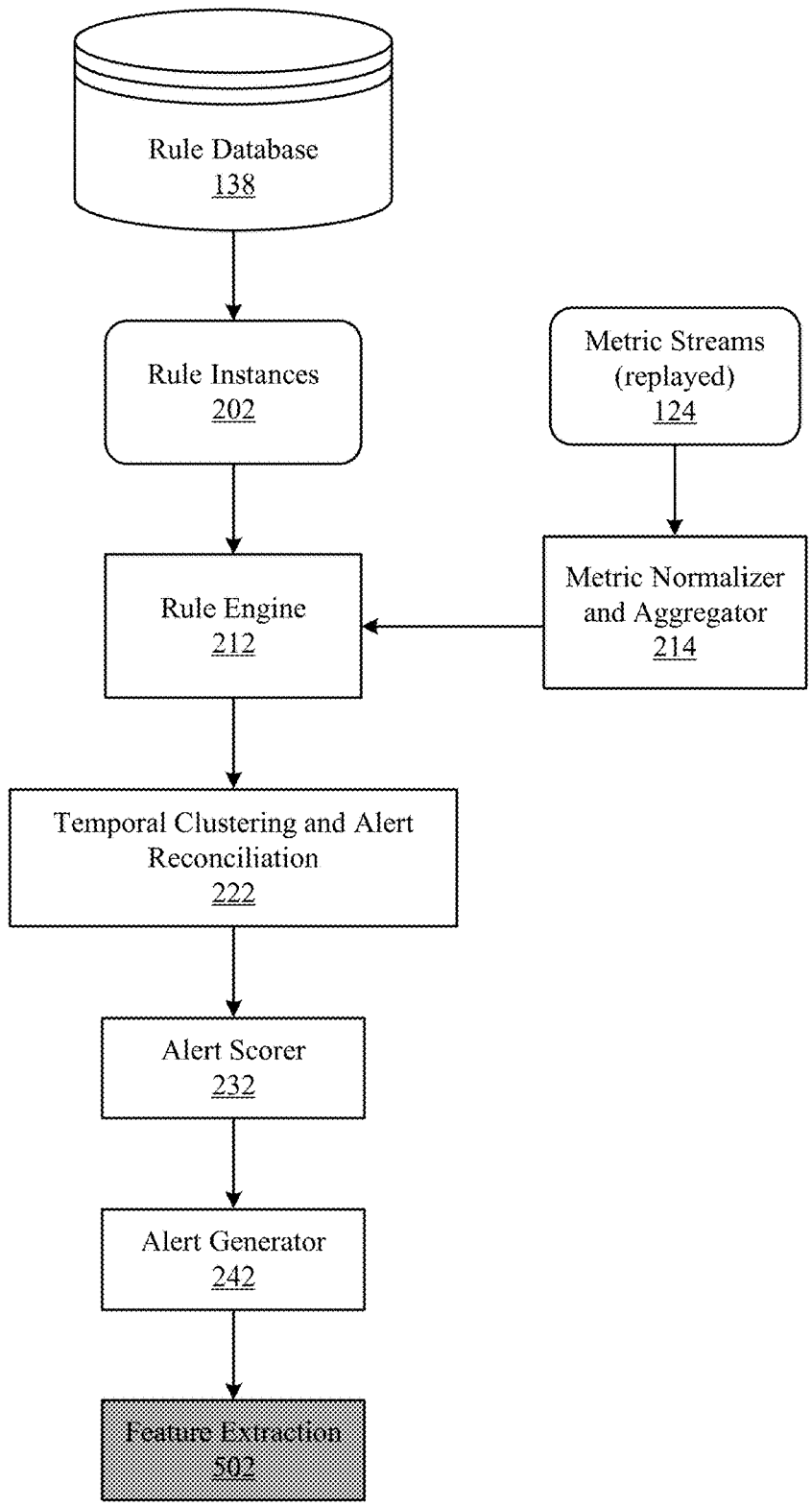
FIG. 5 illustrates one implementation of a rule execution system with an anomaly detection system using circumstance-specific detectors.

FIG. 5 illustrates one implementation 500 of the rule execution system 100 with an anomaly detection system using circumstance-specific detectors 502 described in U.S. Provisional Patent Application No. 62/107,340, entitled, "ANOMALY DETECTION USING CIRCUMSTANCE-SPECIFIC DETECTORS," supra, and incorporated herein.

The actual communication path between the different components described above can be point-to-point over public and/or private networks. Some items, such as operators 144, might be delivered indirectly, e.g. via an application store (not shown). All of the communications can occur over a variety of networks, e.g. private networks, VPN, MPLS circuit, or Internet, and can use appropriate APIs and data interchange formats, e.g. REST, JSON, XML, SOAP and/or JMS. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as Ethernet, EDGE, 3G, 4G LTE, Wi-Fi and WiMAX. Additionally, a variety of authorization and authentication techniques, such as username/password, OAuth, Kerberos, SecureID, digital certificates and more, can be used to secure the communications.

In some implementations, databases used in rule design system 100 can store information from one or more tenants into tables of a common database image to form a multi-tenant database system (MTS). A database image can include one or more database objects. In other implementations, the databases can be relational database management systems (RDBMSs), object oriented database management systems (OODBMSs), distributed file systems (DFS), no-schema database management systems, or any other data storing systems or computing devices.

While system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components (e.g., for data communication) can be wired and/or wireless as desired. The different elements or components can be combined into single software modules and multiple software modules can run on the same hardware.

Flowcharts

Figure 6:
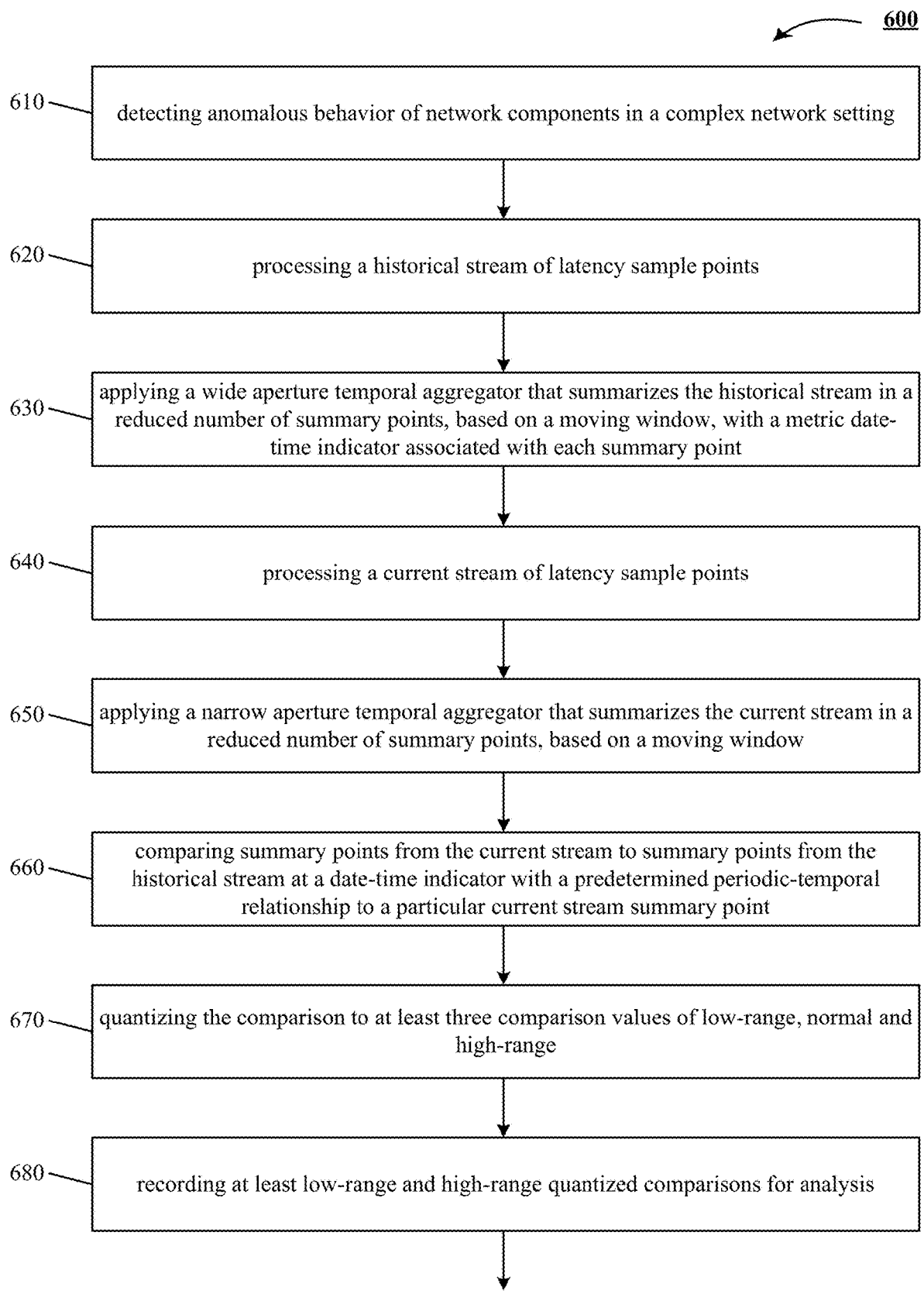
FIG. 6 shows a flowchart of one implementation of detecting anomalous behavior of network components in a complex network setting.

FIG. 6 shows one implementation of a flowchart 600 detecting anomalous behavior of network components in a complex network setting. Flowchart 600 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 6. Multiple actions can be combined in some implementations. For convenience, this workflow is described with reference to the system that carries out a method. The system is not necessarily part of the method.

At action 610, the method includes detecting anomalous behavior of network components in a complex network setting, as described supra.

At action 620, the method includes processing a historical stream of latency sample points, as described supra.

At action 630, the method includes applying a wide aperture temporal aggregator that summarizes the historical stream in a reduced number of summary points, based on a moving window, with a metric date-time indicator associated with each summary point, as described supra.

At action 640, the method includes processing a current stream of latency sample points, as described supra.

At action 650, the method includes applying a narrow aperture temporal aggregator that summarizes the current stream in a reduced number of summary points, based on a moving window, as described supra.

At action 660, the method includes comparing summary points from the current stream to summary points from the historical stream at a date-time indicator with a predetermined periodic-temporal relationship to a particular current stream summary point, as described supra.

At action 670, the method includes quantizing the comparison to at least three comparison values of low-range, normal and high-range, as described supra.

At action 680, the method includes recording at least low-range and high-range quantized comparisons for analysis, as described supra.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as introduction, rule design system, operators and rule grammar, domain rules, ensemble rules, etc.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Figure 7:
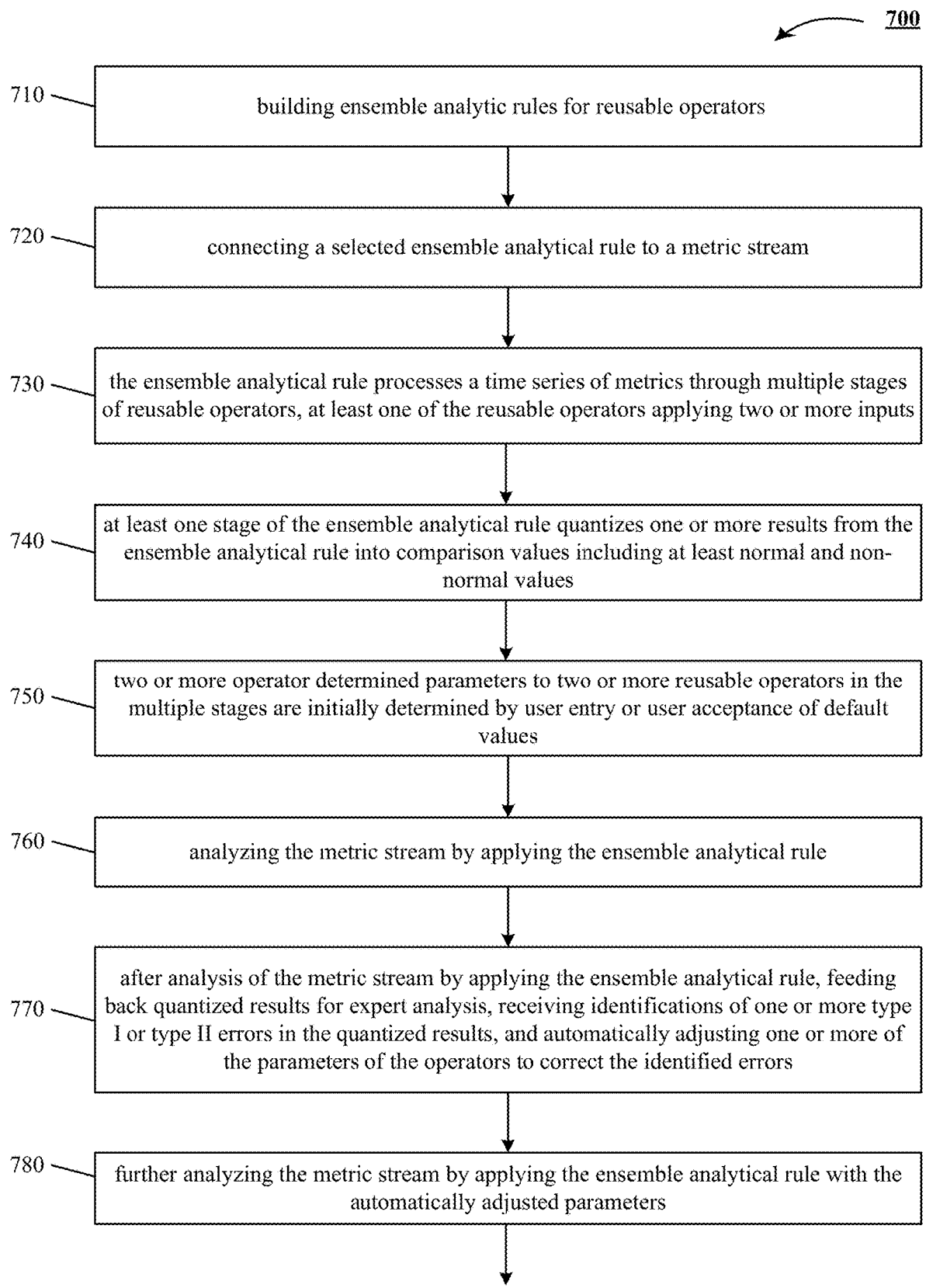
FIG. 7 shows a flowchart of one implementation of building ensemble analytic rules for reusable operators.

FIG. 7 shows one implementation of a flowchart 700 building ensemble analytic rules for reusable operators 710. Flowchart 700 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 7. Multiple actions can be combined in some implementations. For convenience, this workflow is described with reference to the system that carries out a method. The system is not necessarily part of the method.

At action 710, the method includes building ensemble analytic rules for reusable operators, as described supra.

At action 720, the method includes connecting a selected ensemble analytical rule to a metric stream, as described supra.

At action 730, the method includes the ensemble analytical rule processes a time series of metrics through multiple stages of reusable operators, at least one of the reusable operators applying two or more inputs, as described supra.

At action 740, the method includes pro at least one stage of the ensemble analytical rule quantizes one or more results from the ensemble analytical rule into comparison values including at least normal and non-normal values, as described supra.

At action 750, the method includes two or more operator determined parameters to two or more reusable operators in the multiple stages are initially determined by user entry or user acceptance of default values, as described supra.

At action 760, the method includes analyzing the metric stream by applying the ensemble analytical rule, as described supra.

At action 770, the method includes after analysis of the metric stream by applying the ensemble analytical rule, feeding back quantized results for expert analysis, receiving identifications of one or more type I or type II errors in the quantized results, and automatically adjusting one or more of the parameters of the operators to correct the identified errors, as described supra.

At action 780, the method includes further analyzing the metric stream by applying the ensemble analytical rule with the automatically adjusted parameters, as described supra.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as introduction, rule design system, operators and rule grammar, domain rules, ensemble rules, etc.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Figure 8:
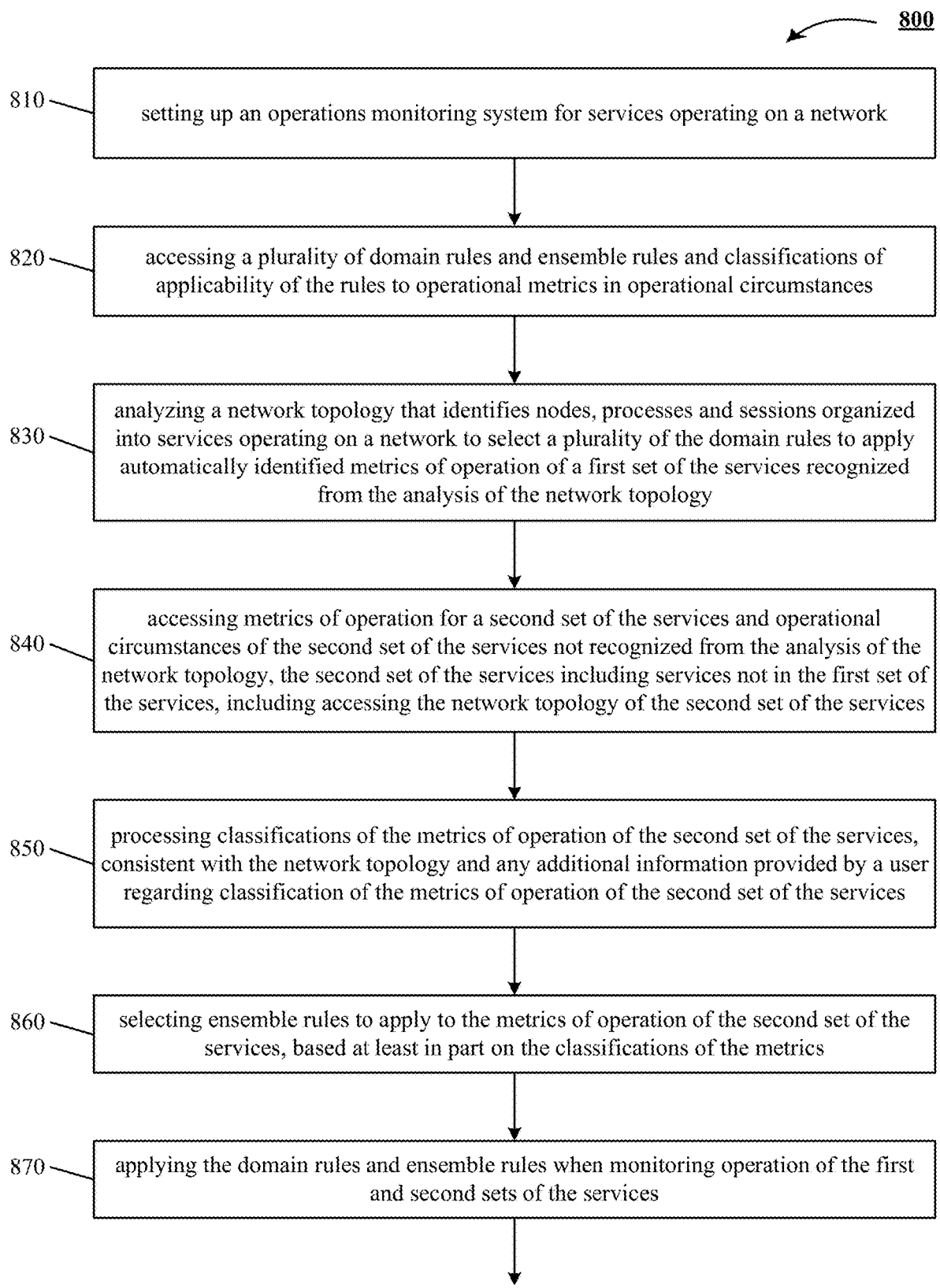
FIG. 8 shows a flowchart of one implementation of setting up an operations monitoring system for services operating on a network.

FIG. 8 shows one implementation of a flowchart 800 setting up an operations monitoring system for services operating on a network 810. Flowchart 800 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 8. Multiple actions can be combined in some implementations. For convenience, this workflow is described with reference to the system that carries out a method. The system is not necessarily part of the method.

At action 810, the method includes setting up an operations monitoring system for services operating on a network, as described supra.

At action 820, the method includes accessing a plurality of domain rules and ensemble rules and classifications of applicability of the rules to operational metrics in operational circumstances supra.

At action 830, the method includes analyzing a network topology that identifies nodes, processes and sessions organized into services operating on a network to select a plurality of the domain rules to apply automatically identified metrics of operation of a first set of the services recognized from the analysis of the network topology, as described supra.

At action 840, the method includes processing metrics of operation for a second set of the services and operational circumstances of the second set of the services not recognized from the analysis of the network topology, the second set of the services including services not in the first set of the services, including accessing the network topology of the second set of the services, as described supra.

At action 850, the method includes processing classifications of the metrics of operation of the second set of the services, consistent with the network topology and any additional information provided by a user regarding classification of the metrics of operation of the second set of the services, as described supra.

At action 860, the method includes selecting ensemble rules to apply to the metrics of operation of the second set of the services, based at least in part on the classifications of the metrics, as described supra.

At action 870, the method includes applying the domain rules and ensemble rules when monitoring operation of the first and second sets of the services, as described supra.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as introduction, rule design system, operators and rule grammar, domain rules, ensemble rules, etc.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Figure 9:
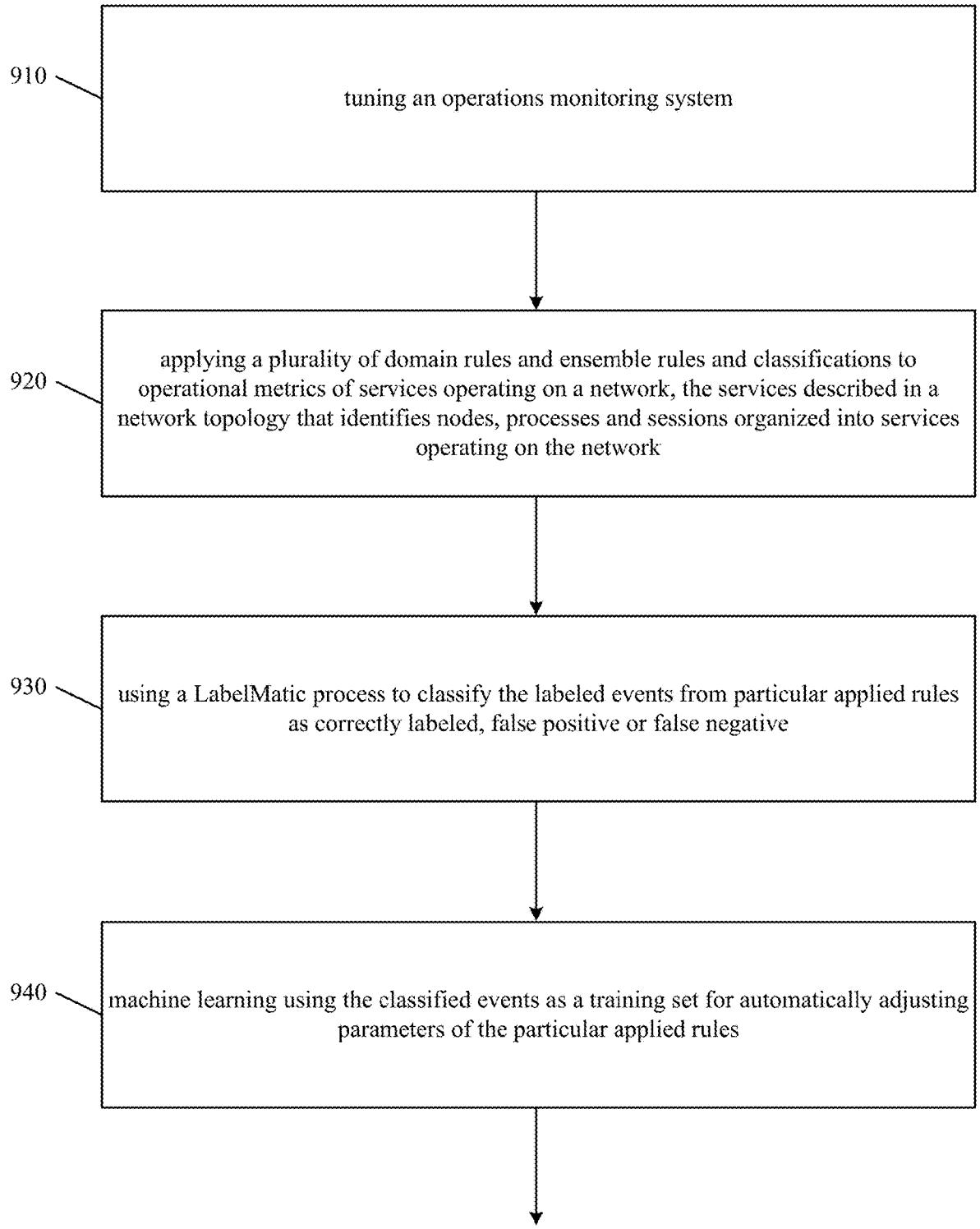
FIG. 9 shows a flowchart of one implementation of tuning an operations monitoring system.

FIG. 9 shows one implementation of a flowchart 900 tuning an operations monitoring system 910. Flowchart 900 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 9. Multiple actions can be combined in some implementations. For convenience, this workflow is described with reference to the system that carries out a method. The system is not necessarily part of the method.

At action 910, the method includes tuning an operations monitoring system, as described supra.

At action 920, the method includes p applying a plurality of domain rules and ensemble rules and classifications to operational metrics of services operating on a network, the services described in a network topology that identifies nodes, processes and sessions organized into services operating on the network, wherein the domain rules and ensemble rules label some events among the operational metrics as anomalous and suspect, as described supra.

At action 930, the method includes using a LabelMatic process to classify the labeled events from particular applied rules as correctly labeled, false positive or false negative, as described supra.

At action 940, the method includes machine learning using the classified events as a training set for automatically adjusting parameters of the particular applied rules, as described supra.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as introduction, rule design system, operators and rule grammar, domain rules, ensemble rules, etc.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Computer System

Figure 10:
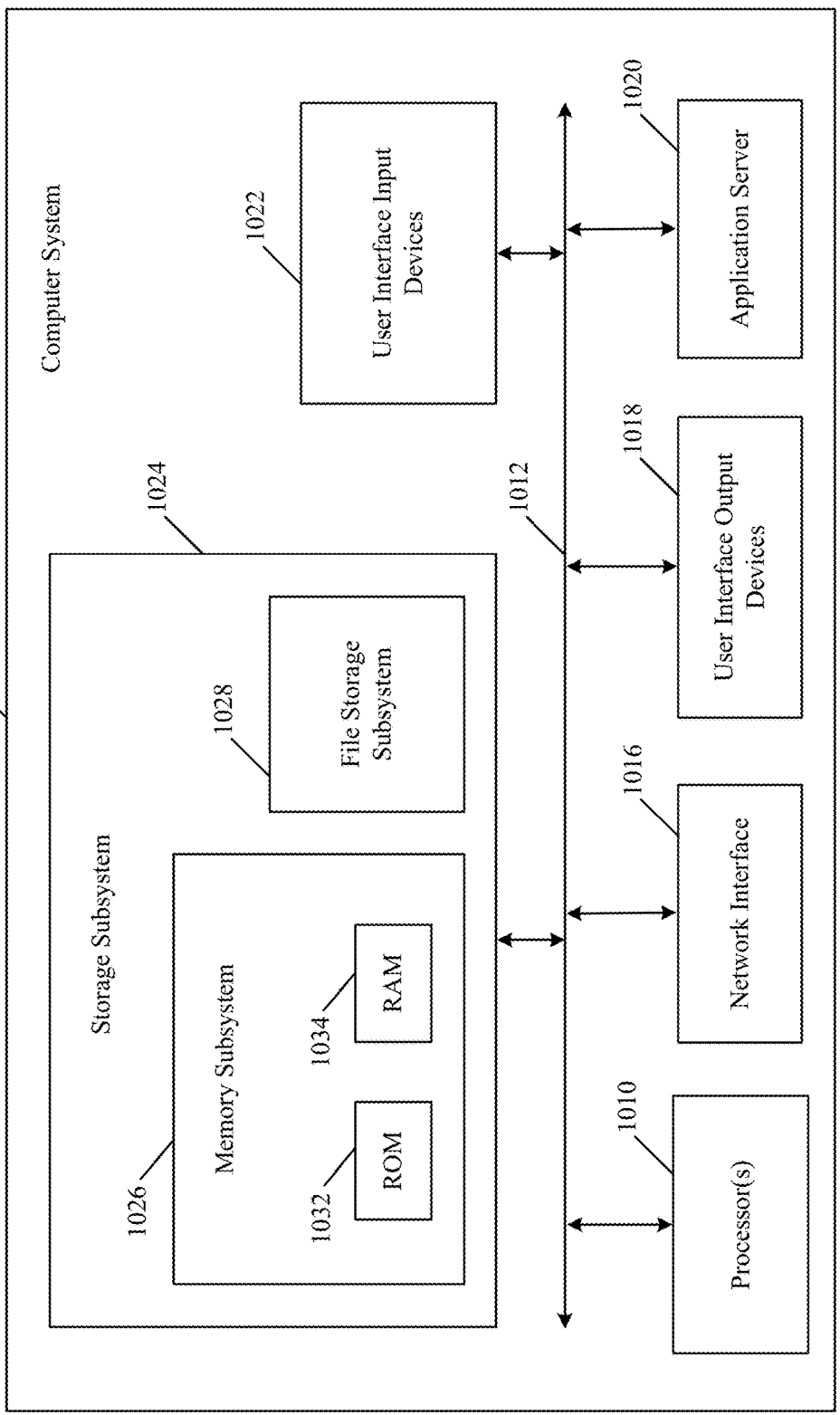
FIG. 10 is a block diagram of an example computer system for detecting anomalous behavior of network components in a complex network setting.

FIG. 10 is a block diagram 1000 of an example computer system 1000 for detecting anomalous behavior of network components in a complex network setting. Computer system 1000 typically includes at least one processor 1010 that communicates with a number of peripheral devices via bus subsystem 1012. These peripheral devices can include a storage subsystem 1024 including, for example, memory devices and a file storage subsystem, user interface input devices 1022, user interface output devices 1018, and a network interface subsystem 1016. The input and output devices allow user interaction with computer system 1000. Network interface subsystem 1016 provides an interface to outside networks, including an interface to corresponding interface devices in other computer systems.

User interface input devices 1022 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1000.

User interface output devices 1018 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1000 to the user or to another machine or computer system.

Storage subsystem 1024 stores programming and data constructs that provide the functionality of some or all of the modules and methods described herein. These software modules are generally executed by processor 1010 alone or in combination with other processors.

Memory 1026 used in the storage subsystem can include a number of memories including a main random access memory (RAM) 1034 for storage of instructions and data during program execution and a read only memory (ROM) 1032 in which fixed instructions are stored. A file storage subsystem 1028 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1028 in the storage subsystem 1024, or in other machines accessible by the processor.

Bus subsystem 1012 provides a mechanism for letting the various components and subsystems of computer system 1000 communicate with each other as intended. Although bus subsystem 1012 is shown schematically as a single bus, alternative implementations of the bus subsystem can use multiple busses. Application server 1020 can be a framework that allows the applications of computer system to run, with software running on hardware, e.g., the operating system.

Computer system 1000 can be of varying types including a workstation, server, computing cluster, blade server, server farm, or any other data processing system or computing device. Due to the ever-changing nature of computers and networks, the description of computer system 1000 depicted in FIG. 10 is intended only as one example. Many other configurations of computer system 1000 are possible having more or fewer components than the computer system depicted in FIG. 10.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A system for building an ensemble analytical rule using reusable operators, including:
   a storage that stores rules;
   one or more processors coupled to the storage;
   a rule instantiator including instructions that when executed by the one or more processors connects an ensemble analytical rule to a metric stream of performance information of a network selected for metrics of the metric stream based upon a metric class received from a metric classifier UI;

a rule engine including instructions that when executed by the one or more processors analyzes the metric stream by applying the ensemble analytical rule to process a time series of metrics through multiple stages of reusable operators, quantizes one or more results from the ensemble analytical rule into comparison values including at least normal and non-normal values; and an alert scorer and/or an alert tuner including instructions that when executed by the one or more processors provides the quantized results for expert analysis, receives identifications of one or more errors in the quantized results, and automatically adjusts one or more parameters of the reusable operators to correct the identified errors; and wherein the rule engine further analyzes the metric stream by applying the ensemble analytical rule with the one or more parameters as automatically adjusted.

2. The system of claim 1, further implementing actions transmitting an alert to a human operator when non-normal comparison values are repeatedly detected over a predetermined time.

3. The system of claim 1, further implementing actions transmitting an alert to a human operator when repeated normal comparison values are repeatedly detected over a predetermined time.

4. The system of claim 1, wherein at least one of the reusable operators applies two or more inputs selected from a set consisting of a metric stream and an output stream of another operator.

5. The system of claim 1, wherein two or more operator determined parameters of two or more of the reusable operators in the multiple stages are initially determined from a user entry or a user acceptance of default values.

6. The system of claim 1, wherein operators are organized into a decision tree rooted by a single operator output.

7. The system of claim 6, further implementing actions of estimating using the decision tree, a severity of anomalous data points in the metric stream.

8. The system of claim 1, wherein expert analysis includes application of one or more domain rules that incorporate specific and targeted expert domain knowledge optimized according to metric class of performance metrics.

9. The system of claim 1, wherein the metric stream measures latency of a first network computing device responding to a message from a second network computing device.

10. A method of building an ensemble analytical rule using reusable operators, the method including:

connecting, by a rule instantiator, an ensemble analytical rule to a metric stream of performance information of a network selected for metrics of the metric stream based upon a metric class received from a metric classifier UI;

analyzing, by a rule engine, the metric stream by applying the ensemble analytical rule to process a time series of metrics through multiple stages of reusable operators;

quantizing one or more results from the ensemble analytical rule into comparison values including at least normal and non-normal values;

providing the quantized results for expert analysis;

receiving identifications of one or more errors in the quantized results; and automatically adjusting one or more parameters of the reusable operators to correct the identified errors;

further analyzing the metric stream by applying the ensemble analytical rule with the one or more parameters as automatically adjusted.

11. The method of claim 10, further including transmitting an alert to a human operator when non-normal comparison values are repeatedly detected over a predetermined time.

12. The method of claim 10, further including transmitting an alert to a human operator when repeated normal comparison values are repeatedly detected over a predetermined time.

13. The method of claim 10, wherein at least one of the reusable operators applies two or more inputs selected from a set consisting of a metric stream and an output stream of another operator.

14. The method of claim 10, wherein two or more operator determined parameters of two or more of the reusable operators in the multiple stages are initially determined from a user entry or a user acceptance of default values.

15. The method of claim 10, wherein operators are organized into a decision tree rooted by a single operator output.

16. The method of claim 15, further implementing actions of estimating using the decision tree, a severity of anomalous data points in the metric stream.

17. The method of claim 10, wherein expert analysis includes application of one or more domain rules that incorporate specific and targeted expert domain knowledge optimized according to metric class of performance metrics.

18. The method of claim 10, wherein the metric stream measures latency of a first network computing device responding to a message from a second network computing device.

19. A non-transitory computer readable storage medium impressed with computer program instructions to build an ensemble analytical rule using reusable operators, the computer program instructions, when executed on one or more processors, implement a method comprising:

connecting, by a rule instantiator, an ensemble analytical rule to a metric stream of performance information of a network selected for metrics of the metric stream based upon a metric class received from a metric classifier UI;

analyzing, by a rule engine, the metric stream by applying the ensemble analytical rule to process a time series of metrics through multiple stages of reusable operators;

quantizing one or more results from the ensemble analytical rule into comparison values including at least normal and non-normal values;

providing the quantized results for expert analysis;

receiving identifications of one or more errors in the quantized results; and automatically adjusting one or more parameters of the reusable operators to correct the identified errors;

further analyzing the metric stream by applying the ensemble analytical rule with the one or more parameters as automatically adjusted.

* * * * *